United States Patent
Shoumaker et al.

(10) Patent No.: US 11,640,609 B1
(45) Date of Patent: May 2, 2023

(54) NETWORK BASED FEATURES FOR FINANCIAL CRIME DETECTION

(71) Applicant: Wells Fargo Bank, N.A., San Francisco, CA (US)

(72) Inventors: Wayne B. Shoumaker, San Francisco, CA (US); Harsh Singhal, Charlotte, NC (US); Suhas Sreehari, Berkeley, CA (US); Agus Sudjianto, Charlotte, NC (US); Ye Yu, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 123 days.

(21) Appl. No.: 16/714,027

(22) Filed: Dec. 13, 2019

(51) Int. Cl.
| | |
|---|---|
| *G06Q 20/40* | (2012.01) |
| *G06Q 50/00* | (2012.01) |
| *G06Q 20/10* | (2012.01) |
| *G06Q 40/02* | (2012.01) |
| *G06Q 40/00* | (2012.01) |
| *G06N 20/00* | (2019.01) |
| *G06N 3/08* | (2006.01) |

(52) U.S. Cl.
CPC ........... *G06Q 20/4016* (2013.01); *G06N 3/08* (2013.01); *G06N 20/00* (2019.01); *G06Q 20/10* (2013.01); *G06Q 40/02* (2013.01); *G06Q 50/01* (2013.01); *G06Q 40/00* (2013.01)

(58) Field of Classification Search
CPC .............................. G06Q 40/00; G06Q 50/01
USPC .......................................................... 706/46
See application file for complete search history.

(56) References Cited

U.S. PATENT DOCUMENTS

| | | | |
|---|---|---|---|
| 8,095,441 | B2 | 1/2012 | Wu et al. |
| 8,682,764 | B2 | 3/2014 | Love et al. |
| 9,501,799 | B2 | 11/2016 | Bothwell et al. |
| 9,830,663 | B2 | 11/2017 | Roberts et al. |
| 9,836,795 | B2 | 12/2017 | Roberts et al. |
| 9,892,465 | B2 | 2/2018 | Love et al. |
| 9,942,250 | B2 | 4/2018 | Stiansen et al. |
| 10,109,017 | B2 | 10/2018 | Bothwell et al. |

(Continued)

OTHER PUBLICATIONS

Garcia, Nuno C., "Social Network Analysis for Insurance Fraud Detection", Universidade Da Beira Interior, Diss. 2015. 61 pages.

*Primary Examiner* — Lindsay M Maguire
(74) *Attorney, Agent, or Firm* — Foley & Lardner LLP

(57) ABSTRACT

Disclosed is an example approach in which network and non-network features are used to train a predictive machine learning model that is implemented to predict financial crime and fraud. Graphical network features may be generated by applying financial entity risk vectors to a network model with representations of various types of networks. The network model may comprise transactional, non-social, and/or social networks, with edges corresponding to linkages that may be weighted according to various characteristics (such as frequency, amount, type, recency, etc.). The graphical network features may be fed to the predictive model to generate a likelihood and/or prediction with respect to a financial crime. A perceptible alert is generated on one or more computing devices if a financial crime is predicted or deemed sufficiently likely. The alert may identify a subset of the set of financial entities involved in the financial crime and present graphical representations of networks and linkages.

20 Claims, 7 Drawing Sheets

(56) References Cited

U.S. PATENT DOCUMENTS

| | | | |
|---|---|---|---|
| 10,212,174 B2 | 2/2019 | Muddu et al. | |
| 2005/0222929 A1 | 10/2005 | Steier et al. | |
| 2006/0149674 A1* | 7/2006 | Cook | G06Q 40/02 |
| | | | 705/44 |
| 2008/0021801 A1* | 1/2008 | Song | G06Q 10/0635 |
| | | | 705/35 |
| 2011/0208630 A1* | 8/2011 | Hazzani | G06Q 40/02 |
| | | | 705/35 |
| 2012/0109821 A1 | 5/2012 | Barbour et al. | |
| 2012/0284155 A1* | 11/2012 | Holten | G06Q 40/00 |
| | | | 705/35 |
| 2013/0159235 A1* | 6/2013 | Hatami-Hanza | G06N 5/02 |
| | | | 706/46 |
| 2014/0058763 A1 | 2/2014 | Zizzamia et al. | |
| 2014/0058914 A1* | 2/2014 | Song | G06Q 40/06 |
| | | | 705/35 |
| 2014/0195984 A1 | 7/2014 | Aslam et al. | |
| 2015/0081324 A1* | 3/2015 | Adjaoute | G06Q 40/08 |
| | | | 705/2 |
| 2017/0063900 A1 | 3/2017 | Muddu et al. | |
| 2018/0033006 A1 | 2/2018 | Goldman et al. | |
| 2018/0033009 A1 | 2/2018 | Goldman et al. | |
| 2018/0068395 A1 | 3/2018 | Gupta et al. | |
| 2018/0075539 A1 | 3/2018 | Roberts et al. | |
| 2019/0026461 A1 | 1/2019 | Cidon et al. | |
| 2019/0028499 A1 | 1/2019 | Cidon et al. | |
| 2019/0028509 A1 | 1/2019 | Cidon et al. | |
| 2019/0066248 A1 | 2/2019 | McEachern et al. | |
| 2020/0258147 A1* | 8/2020 | Song | G06F 16/22 |

\* cited by examiner

NETWORK BASED FEATURES FOR FINANCIAL CRIME DETECTION

TECHNICAL FIELD

The present disclosure relates to training and using machine learning predictive models, using graphical network features based on various types of networks as well as other features, for financial crime and fraud detection.

BACKGROUND

Financial institutions use certain classification and outlier identification approaches to identify money laundering and terrorist financing, and for sanctions screening. These approaches generally rely on non-network features for monitored entities. These approaches, however, do not properly consider networks of financial entities and network effects, and financial crimes and fraud cases are thus often missed because relationships of entities are not sufficiently exploited in detecting the financial crimes.

SUMMARY

Various embodiments of the disclosure relate to a machine learning method which may be implemented by a computing system of a financial institution. The method may comprise generating graphical network features by applying financial entity risk indicators to a network model of a set of financial entities and relationships between the financial entities. The method may comprise feeding the graphical network features to a machine learning predictive model to generate a prediction of a financial crime. The machine learning predictive model may have been trained by applying machine learning to network features and non-network features. The method may comprise generating a perceptible alert on one or more computing devices in response to the prediction of the financial crime. The alert may identify a subset of the set of financial entities involved in the financial crime.

In various example embodiments, the network model may comprise a financial transaction network of financial transactions between financial entities in the set of financial entities. Each edge in the financial transaction network may be defined according to at least one of an amount, a frequency, and/or an incidence of financial transactions between a corresponding pair of financial entities in the set of financial entities. Generating the network model may comprise detecting financial transactions in an internal transaction database of the financial institution.

In various example embodiments, the network model may comprise a non-social relationship network of non-social relationships between financial entities in the set of financial entities. Each edge in the non-social relationship network may be defined as denoting existence of a non-social relationship between a corresponding pair of financial entities, each edge weighted according to one or more characteristics of the corresponding non-social relationship. Generating the network model may comprise detecting non-social relationships using customer data stored in a customer database of the financial institution.

In various example embodiments, the network model may comprise a social network corresponding to social linkages between financial entities. Each edge in the social network may be defined as denoting a social linkage between corresponding pairs of financial entities. Each edge may be weighted according to one or more characteristics of the corresponding social linkage. Generating the network model may comprise detecting social linkages using data accessed via social media devices, and/or via internet-accessible devices that store news reports related to financial entities and/or that store biographies of financial entities.

In various example embodiments, the risk indicators may be real-value risk vectors comprising transaction-based risk indicators and/or customer risk scores. The network model may comprise adjacency matrices. Generating the graphical network features may comprise generating graphical network features for combinations of adjacency matrices and risk vectors that compatible with corresponding adjacency matrices.

Various embodiments of the disclosure relate to a machine learning computing system of, for example, a financial institution, the computing system comprising a processor and a memory comprising instructions executable by the processor. The instructions may comprise a machine learning platform configured to generate graphical network features by applying financial entity risk indicators to a network model of a set of financial entities and relationships therebetween. The machine learning platform may be configured to feed the graphical network features to a machine learning predictive model to generate a prediction of a financial crime. The machine learning predictive model may have been trained by applying machine learning to network features and non-network features. The machine learning platform may be configured to generate a perceptible alert on one or more computing devices in response to the prediction of the financial crime. The alert may identify a subset of the set of financial entities involved in the financial crime.

In various example embodiments, the network model may comprise a financial transaction network of financial transactions between financial entities in the set of financial entities. The machine learning platform may define each edge in the financial transaction network according to at least one of an amount, a frequency, and/or an incidence of financial transactions between a corresponding pair of financial entities in the set of financial entities.

In various example embodiments, the network model may comprise a non-social relationship network of non-social relationships between financial entities in the set of financial entities. The machine learning platform may define each edge in the non-social relationship network as denoting existence of a non-social relationship between a corresponding pair of financial entities. Each edge may be weighted according to one or more characteristics of the corresponding non-social relationship.

In various example embodiments, the network model may comprise a social network corresponding to social linkages between financial entities. The machine learning platform may define each edge in the social network as denoting a social linkage between corresponding pairs of financial entities. Each edge may be weighted according to one or more characteristics of the corresponding social relationship.

In various example embodiments, the network model may comprise adjacency matrices. Risk indicators may comprise real-value vectors. The machine learning platform may be configured to generate the graphical network features by generating graphical network features for combinations of adjacency matrices and compatible risk vectors.

Various embodiments of the disclosure relate to a machine learning method implemented by a computing system of, for example, a financial institution. The method may train one or more predictive models for predicting financial crime. The method may comprising generating a network model of financial entities in a first set of financial entities and relationships between financial entities in the first set of financial entities. The network model may comprise at least a financial transaction network of financial transactions between financial entities in the first set of financial entities. Each edge in the financial transaction network may be defined according to at least one of an amount, a frequency, and/or an incidence of financial transactions between a corresponding pair of financial entities in the first set of financial entities. Each edge in the financial transaction network may be weighted according to at least one of an amount, a frequency, and/or an incidence of financial transactions between a corresponding pair of financial entities in the first set of financial entities. Alternatively or additionally, the network model may comprise at least a non-social relationship network of non-social relationships between financial entities in the first set of financial entities. Each edge in the financial relationship network may be defined as denoting existence of a financial relationship between a corresponding pair of financial entities. Each edge in the non-social relationship network may be weighted according to one or more characteristics of the corresponding non-social relationship. Alternatively or additionally, the network model may comprise at least a social network corresponding to social linkages between financial entities. Each edge in the social network may be defined as denoting a social linkage between corresponding pairs of financial entities. Each edge in the social network may be weighted according to one or more characteristics of the corresponding social relationship. The method may comprise generating graphical network features by applying financial entity risk indicators to the network model. The method may comprise applying machine learning to the graphical network features to train a machine learning predictive model configured to generate predictions of financial crimes and perceptible alerts identifying financial entities involved in the financial crime on one or more computing devices in response to predictions of financial crimes.

In various example embodiments, the method may comprise feeding graphical network features corresponding to financial entities in a second set of financial entities to generate a prediction of a financial crime involving a subset of financial entities in the second set of financial entities. The method may comprise generating a perceptible alert on one or more computing devices in response to the prediction of the financial crime. The alert may identify the subset of financial entities.

In various example embodiments, the risk indicators may be real-value risk vectors comprising at least one of transaction-based risk indicators and/or customer risk scores. The network model may comprise adjacency matrices. Generating the graphical network features may comprise generating graphical network features for combinations of adjacency matrices and compatible risk vectors.

These and other features, together with the organization and manner of operation thereof, will become apparent from the following detailed description and the accompanying drawings.

DETAILED DESCRIPTION

Figure 1:
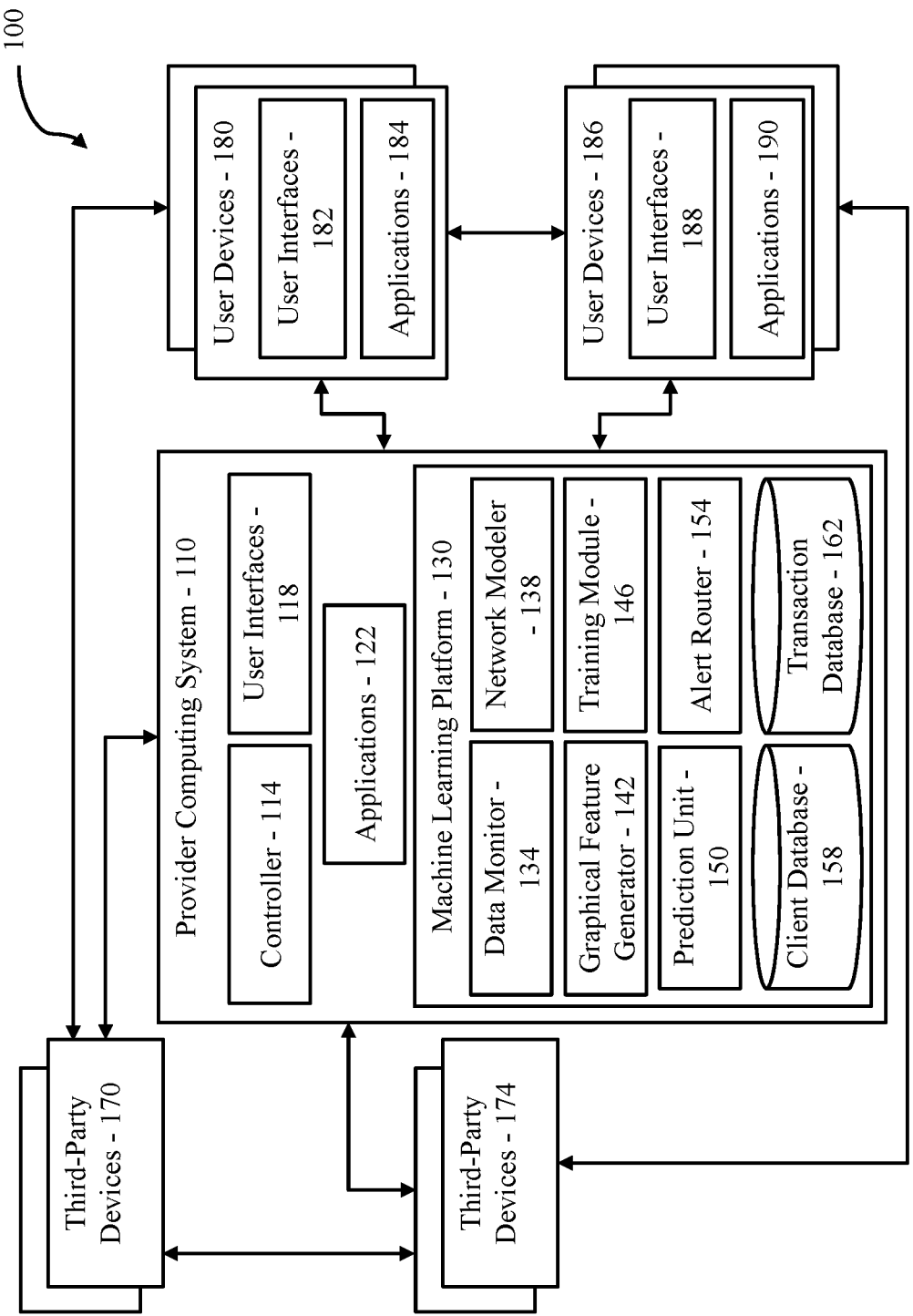
FIG. 1 is a block diagram of a provider computing system that implements a machine learning platform and that communicates with third-party devices and user devices, according to potential embodiments.

In various embodiments, machine learning approaches, which may involve supervised and/or unsupervised learning, may use informative network-based and other features for detecting financial crimes. Features may be created based on various types of networks, and such network-based features may be used for training and implementing predictive machine learning models for detecting, for example, money laundering and fraud by monitored entities. A network representation of financial entities and their relationships can be created, and the network used to translate risk indicators into graphical features. Machine learning models may be applied to the graphical features to reveal hidden connections and thereby more effectively and efficiently discover financial crimes.

A machine learning platform trains and uses models to exploit the fact that financial entities (e.g., people or businesses participating in financial transactions) are part of several networks at the same time. In various embodiments, these networks can be modeled as graphs, which may be described by adjacency matrices (or adjacency lists for computational efficiency, in cases where the relationship matrices are sparse). Several networks are relevant for financial entities and their potentially-suspicious activities, such as, for example, financial transaction networks, non-social networks, and social networks. In a financial transaction network, for example, an edge in the corresponding graph correlates with transactions between pairs of financial entities. In a financial ("non-social") relationship network, an edge in the corresponding graph denotes existence of a financial relationship (e.g., co-ownership of a business, fund-raising, employment, etc.) between pairs of financial entities. And in a social network, an edge in the corresponding graph may denote a social linkage.

Financial institutions have risk indicators on financial entities being monitored. These risk indicators may be represented as real-valued vectors that are compatible with the adjacency matrices described above. Relevant risk indicators may include transaction-based risk indicators, for which financial entities previously involved in financial crimes would have large values, and customer risk scores, which may be a-priori risk scores for the financial entities under consideration. To generate network-based features, for any combination of network and risk indicator, the centrality of an entity and propagation of risk can be modeled through matrix operations.

Alert generating models for financial crimes may rely on supervised machine learning techniques and/or unsupervised machine learning techniques. These network-based graphical features, when added to conventional sets of features, provide a mechanism for accounting for risk propagation from connected financial entities in unearthing financial crimes that would otherwise go undetected.

The machine learning platform may employ a variety of machine learning techniques in classification and pattern recognition of data to determine normal patterns in data and to identify unusual outlier data points. For example, regression algorithms may be used to decide which data points are the most important causal factors that drive certain results. Decisioning algorithms may drive the system to analyze situations to decide what the best course of action may be based on the available options. Clustering algorithms may also be employed, such as in situations in which it is uncertain how to classify a result or dataset, to classify the result in a specific category if the result is within a specific distance from a cluster of other data points.

In various embodiments, values in a set can be categorized using unsupervised clustering algorithms such as k-means or Density-Based Spatial Clustering of Applications with Noise (DBSCAN), with no dependent variable associated therewith. Alternatively or additionally, other approaches can be used to detect a sequence or pattern of behavior. For example, long short term memory (LSTM) recurrent neural networks (RNNs), gradient boosted trees, random forest, logistic regression, hidden and basic Markov models, and frequent pattern growth algorithms may be utilized in classifying patterns and decisions while training the various machine learning models discussed herein.

In some embodiments, clusters may be developed using, for example, Python, SAS, R, Spark and/or H20. In certain versions, k-means clustering may be developed using the SAS FASTCLUS procedure, which performs a disjoint cluster analysis on the basis of distances computed from one or more quantitative variables. The observations may be divided into clusters such that every observation belongs to one and only one cluster. The clusters do not form a tree structure. The FASTCLUS procedure uses Euclidean distances, so the cluster centers are based on least-squares estimation. This kind of clustering method is often called a k-means model. The clustering aims to partition n observations into k clusters in which each observation belongs to the cluster with the nearest mean. The final cluster centers are the means of the observations assigned to each cluster when the algorithm is run to complete convergence. Each iteration reduces the least-squares criterion until convergence is achieved. Multiple machine learning techniques may be employed, in turn or in parallel, in training and applying the machine learning models discussed herein. A common shortcoming of k-means clustering is that the algorithms generally assume distances along all dimensions to be equally important while making clustering decisions. Feature scaling may be used to prevent situations where the data clusters are not skewed in the feature space, but practical implementations of such scaling can be challenging. In such cases, various implementations may employ DBSCAN to cluster the data points using a density-based approach. Before such implementations begin, two parameters are set: $\epsilon>0$, which defines the radius of a dense region, and $\lambda>1$, which denotes the minimum number of points for a region to be considered dense. The algorithms may comprise the following steps that are looped through until all the data points are covered: (1) Find all points in the $\epsilon$-neighborhood of every point; all points which have at least A points within their $\epsilon$-neighborhood are considered core points. (2) Find the connected components of these core points based on some distance metric (which could be Euclidean but does not have to be); (3) Each non-core point is assigned to a cluster if there is a point of the cluster that is within an $\epsilon$-distance from the non-core point, otherwise the non-core point is considered as noise. In example implementations, Python's Scikit-Learn, which contains a ready-to-use DBSCAN package, can be used to perform the above-described clustering.

Financial crimes are often not discoverable through the recorded activities of an individual, but through relationships and linkages of that individual with others. Certain activities may disguise financial crimes unless the activities are placed in the context of the activities of networks of entities with some discoverable association which may, in isolation, seem innocuous. The disclosed approach thus enables the discovery, prevention, and resolution of past and ongoing financial crimes and fraud that could not otherwise be unearthed through conventional means. Further, the disclosed approach reveals relevant underlying associations and connections between entities and transactions not feasibly discoverable by human users. Training a predictive model using a combination of network-based and other features as disclosed herein places the relevant circumstances and data in context rather than being considered in isolation, and yields enhanced, actionable predictions.

Example embodiments of the machine learning model described herein improve computer-related technology by performing functions that cannot be carried out by conventional computing systems. Furthermore, the embodiments described herein cannot be carried out by humans themselves. The machine learning model may proactively determine graphical features corresponding to financial entities and network linkages thereof in discovering crimes that would otherwise go undetected. In some embodiments, the databases described herein may be data-type agnostic and configured to store and update a variety of information for thousands of users, account information, and so on. Conventional systems may include databases and definitions that are static and cannot be configured to acquire, store, and update the multitude of information in the database of data from interactions with entities.

Referring to FIG. 1, a block diagram of an example system 100 is shown, according to potential embodiments. The system 100 includes a provider computing system 110 (of, e.g., a financial institution), which may be implemented using one or more computing devices. The system 100 also includes third-party devices 170, 174 (of, e.g., news sources, social media devices, etc.), and user devices 180, 186 (of, e.g., financial crime or fraud investigators). The components of the system 100 may be communicably and operatively coupled to each other directly or over a network that permits the direct or indirect exchange of data, values, instructions, messages, and the like (represented by double-headed arrows in FIG. 1). Each system and device in system 100 may include one or more processors, memories, network interfaces, and user interfaces. The memory may store programming logic that, when executed by the processor, controls the operation of the corresponding computing device. The memory may also store data in databases. The network interfaces allow the computing devices to communicate wirelessly or otherwise by sending and receiving transmissions via one or more communications protocols. Wireless interfaces may enable, for example, near-field communication (NFC) between two devices located close to each other (e.g., within four centimeters of each other), and may include other protocols such as Bluetooth, Wi-Fi, and/or wireless broadband. The various components of devices in system 100 may be implemented via hardware (e.g., circuitry), software (e.g., executable code), or any combination thereof. Each system and device in system 100 may moreover include a security client which may provide fraud prevention measures and security protections (such as generation of security tokens, authentication of devices, verification of biometric or other security data, etc.).

The systems and devices in system 100 may also include application programming interface (API) gateways to allow the systems and devices to engage with each other via various APIs, such as APIs that facilitate authentication, data retrieval, etc. Generally, an API is a software-to-software interface that allows a first computing system of a first entity to utilize a defined set of resources of a second (external) computing system of a second (third-party) entity to, for example, access certain data and/or perform various functions. In such an arrangement, the information and functionality available to the first computing system is defined, limited, or otherwise restricted by the second computing system. To utilize an API of the second computing system, the first computing system may make an API call to the second computing system. The API call may be accompanied by a security or access token or other data to authenticate the first computing system and/or a particular user. The API call may also be accompanied by certain data/inputs to facilitate the utilization or implementation of the resources of the second computing system, such as data identifying users (e.g., name, identification number, biometric data), accounts, dates, functionalities, tasks, etc. In system 100, a system or device may provide various functionality to other systems and devices through APIs by accepting API calls via an API gateway. The API calls may be generated via an API engine of a system or device to, for example, make a request from another system or device.

The provider computing system 110 may include a controller 114 with a processor and memory with instructions executed by the processor to control operations and functionality of the provider computing system 110 and components thereof. User interfaces 118 may include input/output (I/O) components may allow a user to provide inputs (e.g., a touchscreen, stylus, force sensor for sensing pressure on a display screen, etc.) and provide perceptible outputs (e.g., displays and light sources for visually-perceptible elements, a speaker for audible elements, and haptics for perceptible signaling via touch). User interfaces 118 may include biometric sensors such as fingerprint readers, heart monitors that detect cardiovascular signals, iris scanners, face scanners, and so forth. User interfaces 118 may also include ambient sensors that detect surrounding conditions, such as ambient sights and sounds, and may include cameras, imagers, or other light detectors, and microphones or other sound detectors. User interfaces 118 may also include location and orientation sensors, such as a GPS device, gyroscope, digital compass, accelerometer, etc. Provider computing system 110 may also run one or more applications 122 that allow users to interact with system 110 and input selections for various functionalities.

Provider computing system 110 may also include a machine learning platform 130 for training various models using machine learning techniques for application to, for example, network-based graphical features and other features. A data monitor 134 may scan external data sources, such as news source devices, social media devices, government body devices, and various other third-party devices 170, 174, as well as internal sources, such as internal databases on customers (e.g., client database 158) and financial transactions (e.g., transaction database 162), in real-time or near real-time. The data monitor 134 may acquire, for example, news alerts (which may identify, e.g., entities to be monitored and thus to be deemed higher-risk entities, or may identify unknown relationships, activities, or circumstances), entity biographies, information on social and non-social linkages, data on large financial transactions, data on formation of new business organizations, etc., from third-party devices 170, 174. Data monitor 134 may use, for example, a "WebCrawler" or a "Google API" to access and retrieve data available through the internet. Data monitor 134 may use any combination of publicly available and proprietary or subscription data sources.

Network modeler 138 may analyze data to identify generate network representations of financial entities and their relationships. For example, network modeler 138 may use financial transaction data to generate financial transaction networks, business organization data to generate non-social networks, and/or social media and customer data to generate social networks. A graphical feature generator 142 may use network models (e.g., networks generated via network modeler 138) and risk data (e.g., risk vectors) to generate graphical features. Training module 146 may use graphical and other features to train a machine learning predictive model for predicting financial crimes and fraud. Prediction unit 150 may use the predictive model to identify financial crimes and fraud. An alert router 154, based on a prediction that a financial crime or fraud has been detected, may then identify a destination device to which information on the crime or fraud should be transmitted. For example, the alert router 154 may determine that a user device 180 (of, e.g., a "special" investigations team) is a suitable destination device for the alert based on a determination that a case is a high-priority matter, and may determine that a user device 186 (of, e.g., a "regular" investigations team) is the suitable destination device for the alert based on a determination that a case is deemed to be lower priority.

It is noted that, in various embodiments, the functions performed by the systems, devices, and components depicted in FIG. 1 may be performed by a greater number of components or fewer components, and may be performed by other combinations of devices and systems. For example, the functions performed by one component as depicted may instead be performed by two or more components, and/or the functions performed by two or more components as depicted may instead be performed by one component. Similarly, functions may be redistributed among components, devices, and systems. For example, the functions performed by one device or system as depicted may instead be performed by other devices and/or systems, and/or the functions performed by two or more devices or systems as depicted may instead be performed by one device or system.

Figure 2:
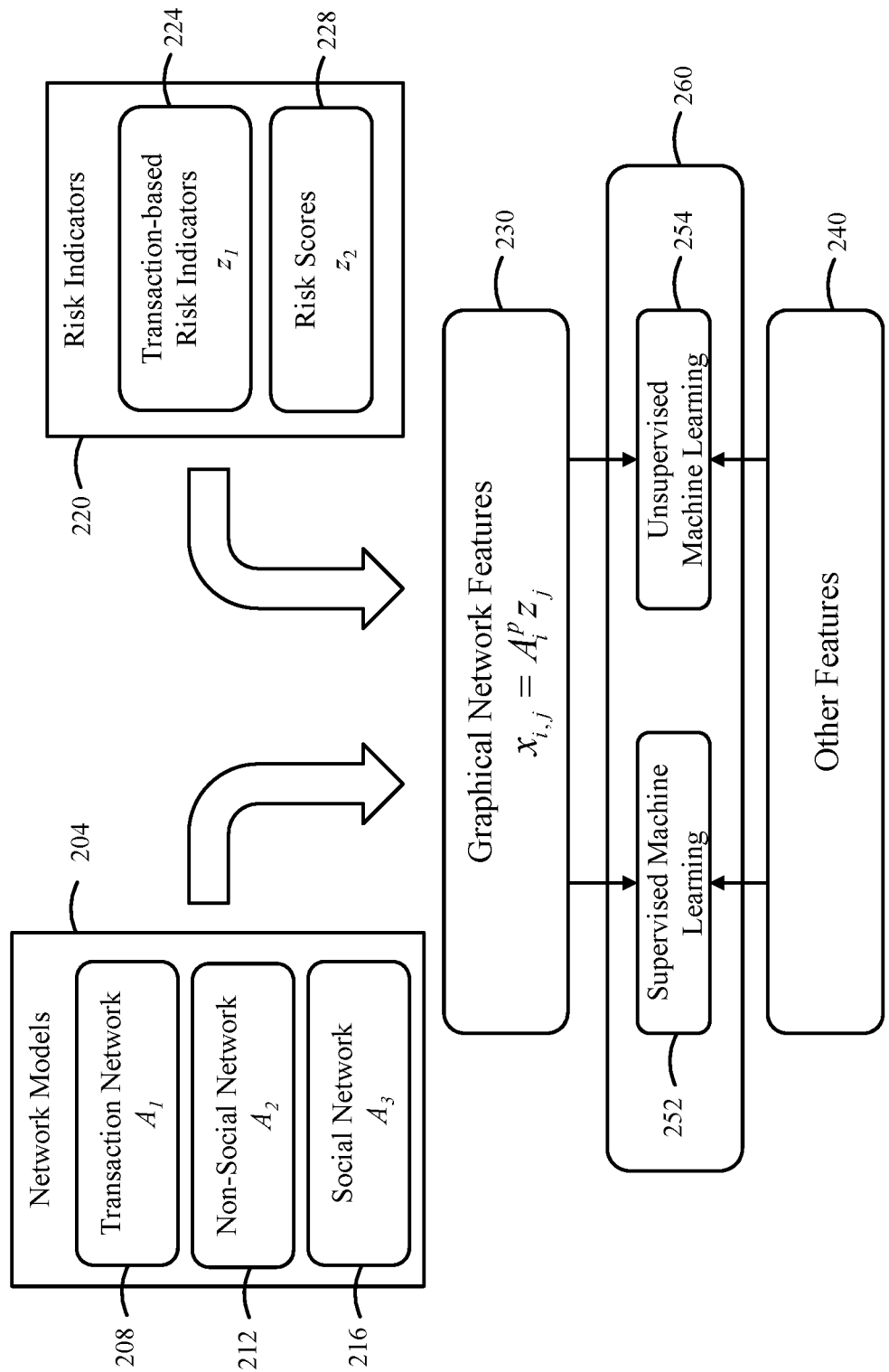
FIG. 2 is a process flow diagram for a machine learning approach to detecting financial crimes that uses graphical network features, according to potential embodiments.

Referring to FIG. 2, an example overall process flow diagram is shown, according to various potential embodiments. Network models 204 (e.g., network representations of financial entity relationships and linkages) may be combined with risk vectors 220 to generate graphical network features 230. Network models may comprise, for example, a transaction network 208 (represented by adjacency matrix $A_1$) corresponding with financial transactions. In transaction networks, edges may correlate with financial transactions between entities. Each edge in the corresponding graph $A_1$ may denote, for example, an amount (value transferred), count (frequency), and/or incidence (presence/absence) of a transaction between a corresponding pair of financial entities. Data monitor 134, for example, may detect such linkages from data in transaction database 162, as well as from external sources. For example, a wire transfer data may include payer and beneficiary information, and each time a wire transfer is detected between two financial entities, the wire transfer would contribute to enhancing the connection weight between those entities in the network representation.

The edge may be weighted according to, for example, the amount of the wire transfer. In various embodiments, an incidence of a wire transfer may denote an edge with a weight of one (1). An edge value may be proportionally increased in weight based on amounts and frequencies of transfers (e.g., the edge value may be multiplied by the number of thousands of dollars transferred, and the number of transfers, such that four transfers of $5,000 may multiply by 4 and 5, yielding a weighted edge of 20. Similarly, an edge value may be weighted according to the sum of all monies transferred, such that 4 transfers of $5,000 may yield a weighted edge value of 20,000. In other embodiments, each transfer may add one to the edge value, as would each multiple of an amount such as 1,000, such that 4 transfers of $5,000 would add 4 and 5, yielding a weighted edge value of 9. In certain implementations, transaction type may impact edge weight, such that, for example, wire transfers are given greater weight (e.g., at a multiple of 1.5) than payments made with check, as certain types of transactions may be deemed to be more often involved in the commission or attempt of financial crimes and fraud than other types of transactions. In various implementations, certain characteristics of financial transfers may be given more weight than other characteristics, such that, for example, frequency of transfers has a disproportionally greater impact on edge weight than amounts of transfers, or vice-versa.

Network models may also comprise, for example, a non-social network 212 (represented by adjacency matrix $A_2$) corresponding with non-social relationships (e.g., business, employment, and contractor relationships). Each edge in the corresponding graph $A_2$ may denote existence of a financial relationship such as co-ownership of items (e.g., vehicles, structures, real estate) or business organizations (e.g., a partnership or corporation), supply chain relationships (e.g., distributor and supplier), fund-raising relationships (e.g., donor and recipient), employment (e.g., employee and employer), etc. between the financial entities. Financial institutions may detect such linkages from, for example, their on-boarding Know Your Customer (KYC) activities. In various embodiments, an edge value such as one (1) may indicate existence of a linkage between two financial entities, such as a link between an owner or board member of a business and the corresponding business. The edges may be weighted according to various characteristics, such as type of relationship (e.g., an owner or president of a company may be more strongly linked with respect to the company than a supplier of office supplies to the company, yielding a larger edge value between the owner or president and the company than between the supplier and the company). Edges may, additionally or alternatively, be weighted according to an amount of time that the relationship has existed, such that a long-time president of a company would be more strongly linked to (i.e., have a higher edge value) the company than would a newly-appointed president. In some implementations, the weight value may be multiplied by a time indicator, such as the number of months or years.

Network models may also comprise, for example, a social network 216 (represented by adjacency matrix $A_3$) corresponding with social relationships (e.g., families, friends, etc.). Each edge in the corresponding graph $A_3$ may denote existence of a social relationship as detected via, for example, publicly-accessible news stories, biographies, social media, and/or internal data sources. For example, politically-exposed persons could be linked to other individuals through news stories. Data monitor 134 may detect social linkages via one or more third-party devices 170, 174, such as those of social networking or business networking websites and applications. In various embodiments, an edge value such as one (1) may indicate existence of a linkage between two financial entities, such as a link between a parent and a child or between two friends identified through a vacation taken together. The edges may be weighted according to various characteristics, such as type of relationship (e.g., a parent and child may be more strongly linked to each other than two casual friends, yielding a larger edge value between the parent and child than the edge value between the casual friends). Edges may, additionally or alternatively, be weighted according to an amount of time that the relationship has existed, such that a couple married for 25 years would be more strongly linked to (i.e., have a higher edge value) than a newlywed couple, as longer relationships may be expected to provide the entities more time to become inextricably linked in their finances and activities. In some implementations, the weight value may be multiplied by a time indicator, such as the number of months or years.

In each network type, individual data records may indicate a specific instance of connection (relationships or linkages) between financial entities. In various embodiments, this data is appropriately aggregated to create an adjacency matrix ("A"). In an example, suppose there are N entities under consideration. Further, suppose M connection data records are imported. An individual record may correspond to a specific wire-transfer or a specific instance of relationship between two entities. In certain implementations, pre-processing may be performed to generate a normalized set of N entities from the connections data. To generate the adjacency matrix A, example embodiments may:

(1) in a Step 1, initialize an N×N matrix A such all elements in the matrix are equal to 0;

(2) in a Step 2, for each connection data record: (i) identify the two entities involved in that connection, referred to as entities i and j; (ii) estimate an optional weight $w_{i,j}$; for example, in case of wire transfer data, the weight may be set to decrease with increasing time elapsed since transaction, and/or the weight may be set to increase as an amount of transaction increases; by default, the weight could be set to 1; (iii) update the (i,j)-th and (j,i)-th elements in the adjacency matrix: $A_{i,j} \leftarrow w_{i,j} A_{i,j}$ and $A_{j,i} \leftarrow w_{i,j} A_{j,i}$.

(3) in a Step 3, repeat Step 2 for all connection data records;

(4) in a Step 4, scale the adjacency matrix A to have an element-wise maximum value of one:

$$A \leftarrow \frac{A}{\max_{i,j} A_{i,j}};$$

and (5) in a Step 5, set diagonal elements to 1: $A_{i,i} \leftarrow 1$.

Financial institutions or other entities may have risk indicators 220 on monitored entities. Such risk indicators can be represented as real valued vectors z that are compatible with (i.e., have dimensions allowing for matrix operations, such as a first matrix having a number of columns that equals a number of rows of a second matrix) the adjacency matrices A described above. Example risk indicators that may be deemed relevant include transaction-based risk indicators $z_1$ and customer risk scores $z_2$. With respect to transaction-based risk indicators $z_1$, any financial entity previously involved in a financial crime or fraud (or other suspicious activity) may have a larger value, indicating the financial entity is deemed to be "riskier" (i.e., that all else being equal, it would be deemed more likely that an entity with a larger transaction-based risk indicator would be involved in a financial crime or fraud than an entity with a significantly smaller transaction-based risk score). The value itself may depend on the nature of or time since the event. For example, filing of a Suspicious Activity Report (SAR) for a transaction may result in assignment of, or increase the value of, a transaction-based risk indicator for the associated entity. With respect to customer risk scores $z_2$, financial institutions may have a priori risk scores for entities under consideration. Customer risk scores may depend on country of domicile, financial products used, involvement in sensitive activities like politics or diplomacy, etc. For example, living in a country or using certain financial products known to be relatively more often used for financial transfers related to financial crimes or fraud, and/or having ties to political positions known to be more prone to corruption or taking of bribes, may increase customer risk scores.

The network model 204 and risk indicators 220 may be used to generate graphical network features 230. For any combination of network and risk indicator, the centrality of an entity and propagation of risk can be modeled as a matrix operation between compatible matrices. Suppose, in an example, a network is given by adjacency matrix A and a risk vector is given by a compatible vector z, then example embodiments generate a graphical feature x, where $x=A^p z$, where p is the number of propagation steps. If p=1, only immediate neighbors of a node in a corresponding network are considered, and the resulting graphical network feature can be viewed as a weighted degree centrality measure. Further, in various embodiments, the adjacency matrix, A, can be made a function of (discrete) time. Each propagation step can either have a constant time lapse, such as T time units. In this simpler model, the risk propagation can be modified to $x=(\Pi_{t=1}^{P} A_{Tt})z$. A more complex model can also be employed wherein each propagation accounts for a non-uniform time lapse of $T_t$. In such cases, the risk propagation can be modified to $x=(\Pi_{t=1}^{P} A_{T_t t})z$.

Figure 3:
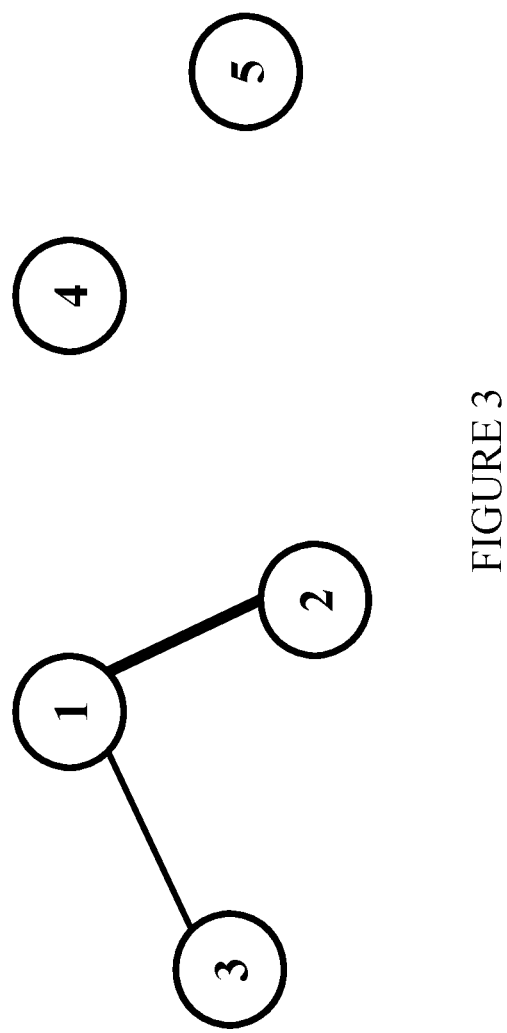
FIG. 3 is an example network in a network model, according to potential embodiments.

In helping illustrate various embodiments, a hypothetical example with five financial entities corresponding with nodes 1 to 5 (i.e., the circled numbers 1, 2, 3, 4, and 5), as shown in FIG. 3, will now be discussed. The network of FIG. 3 can be represented by the adjacency matrix depicted in Table 1.

TABLE 1

Adjacency matrix A corresponding with example network of FIG. 3

| Entity | 1 | 2 | 3 | 4 | 5 |
|---|---|---|---|---|---|
| 1 | 1 | 1 | 0.5 | 0 | 0 |
| 2 | 1 | 1 | 0 | 0 | 0 |
| 3 | 0.5 | 0 | 1 | 0 | 0 |
| 4 | 0 | 0 | 0 | 1 | 0 |
| 5 | 0 | 0 | 0 | 0 | 1 |

For this adjacency matrix, potential cases for the graphical network feature include those in Table 2:

TABLE 2

Example cases for graphical features

| p | z | x | Comment |
|---|---|---|---|
| 1 | (0, 0, 0, 1, 0) | (0, 0, 0, 1, 0) | No propagation of risk since node 4 is not connected |
| 1 | (1, 0, 0, 0, 0) | (1, 1, 0.5, 0, 0) | Risk propagated from node 1 to nodes 2 and 3 in proportion to strength of connection |
| 1 | (0, 1, 0, 0, 0) | (1, 1, 0, 0, 0) | Risk propagated from node 2 to node 1 |
| 2 | (0, 1, 0, 0, 0) | (2, 2, 0.5, 0, 0) | Risk propagated from node 2 to node 1 and 3 (2 steps) |

For a situation in which p is 1 (i.e., one propagation step), if risk vector z is (0, 0, 0, 1, 0), indicating a risk score of 1 for node 4 and zero for the others nodes (i.e., for 1, 2, 3, and 5), then graphical feature x is (0, 0, 0, 1, 0). The risk of node 4 (i.e., entity 4) is not propagated to other nodes because, as can be seen in Table 1 and FIG. 3, node 4 is only connected to itself and to no other node (entity). In another situation in which p is 1, if risk vector z is (1, 0, 0, 0, 0), then the resulting graphical feature x is (1, 1, 0.5, 0, 0). Here, the risk score for node 1 is 1, and because node 1 is connected to nodes 2 and 3, the risk is propagated from node 1 to nodes 2 and 3 in proportion to the strength of the connection (linkage) between the nodes (i.e., between nodes 1 and 2, and between nodes 1 and 3). In yet another situation in which p is 1, if risk vector z is (0, 1, 0, 0, 0), then the resulting graphical feature x is (1, 1, 0, 0, 0). Here, the risk score for node 2 is 1, and because node 2 is only connected to node 1, the risk is propagated from node 2 to node 1 (in proportion to the strength of the connection (linkage) between nodes 2 and 1) but to no other nodes.

In an example situation in which p is 2 (i.e., propagation is 2), if risk vector z is (0, 1, 0, 0, 0), then the resulting graphical feature x is (2, 2, 0.5, 0, 0). Here, the risk score for node 2 is 1, and because node 2 is connected to node 1 which is connected to node 3, the risk is propagated from node 2 to node 1 (one propagation step), and also to all nodes connected to node 1 (i.e., node 3, a second propagation step). Here, risk from being linked to other entities via various networks can be taken into consideration in propagation of risk to detect financial crimes and fraud. In various embodiments, parameter p may be chosen judgmentally and/or through cross-validation, and may depend on the nature of the network, or the risk indicator, or both the nature of the network and the risk indicator.

The graphical network features 230 can be used, in connection with other (e.g., non-network) features 240 to train a predictive model 260 via, for example, supervised machine learning 252 and unsupervised machine learning 254. Alert generating predictive models for financial crimes may rely on or otherwise use supervised techniques such as regression, for example, Random Forest, XG Boost, and/or Neural Networks. Alternatively or additionally, alert generating predictive models may rely on or otherwise use unsupervised techniques such as, for example, Isolation Forests and other outlier detection techniques. Such techniques use various features related to the entity and transaction characteristics (such as transaction volume, transaction inherent risk, reference volumes, transaction amounts, age of transactions, etc.). Supervised learning may use labels indicating ground truth. Adding such network-based features to an existing set of features provides a mechanism for accounting for risk propagation from connected entities in detecting financial crimes.

Figure 4:
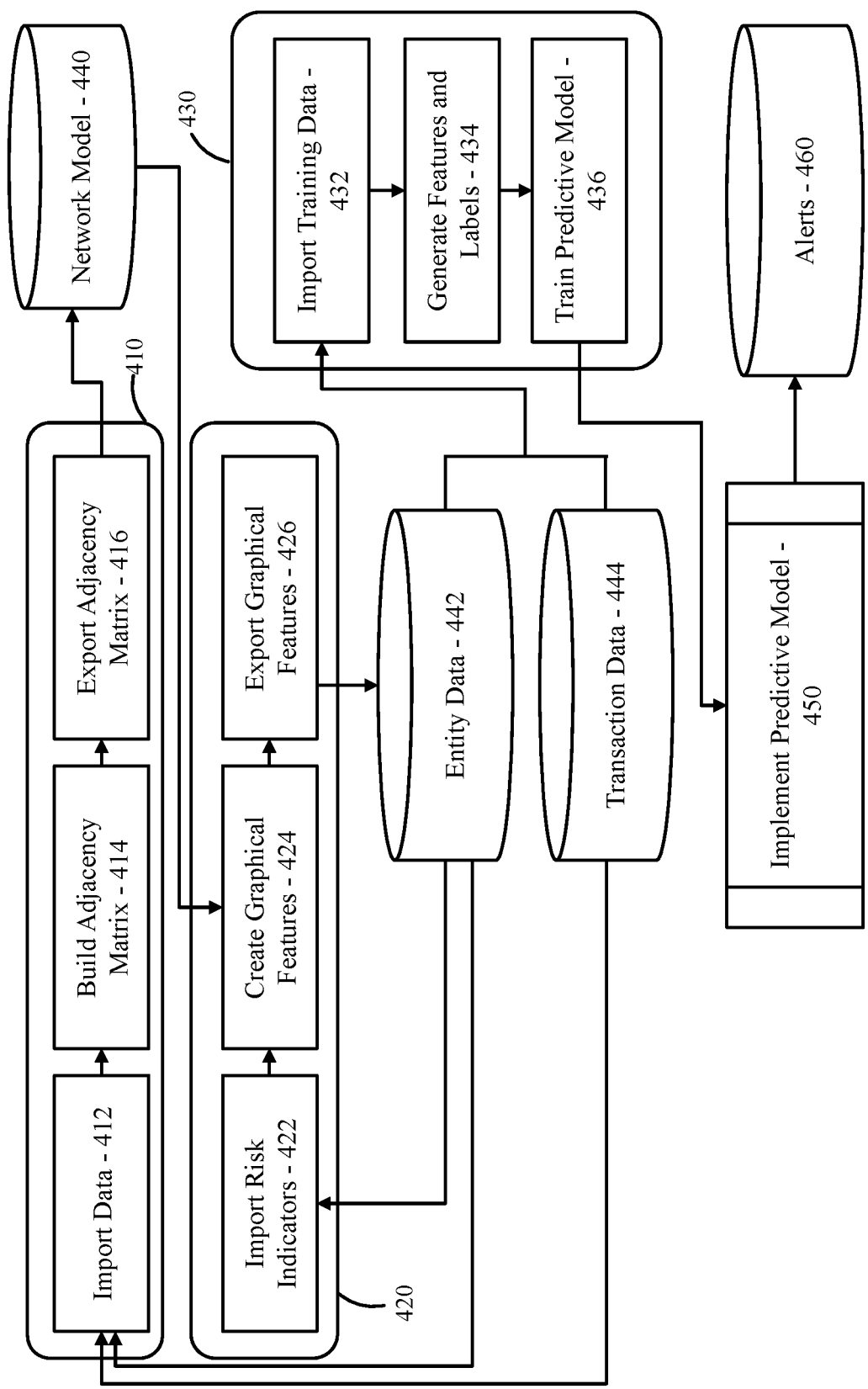
FIG. 4 is an example overall system diagram for implementing a machine learning approach to financial crime detection, according to potential embodiments.

FIG. 4 depicts an example approach in which a network model is generated and used to train a predictive model, according to potential embodiments. As part of a process 410 for building adjacency matrices, at 412, data may be imported (e.g., via data monitor 134) from entity data 442 and transaction data 444, and at 414, used to generate adjacency matrices (e.g., via network modeler 138), which at 416 is output to a network model 440 (which includes various graphical network representations). Similarly, as part of a process 420 for generating graphical features, at 422, risk indicators may be imported (from, e.g., entity database 442), and at 424, used to generate graphical features (via, e.g., graphical feature generator 142) using data from network model 440, and at 426, graphical features are output to entity data 442. As part of a process 430 for training a predictive model, at 432 training data (e.g., data on networks, risk indicators, and actual outcomes, such as confirmed financial crimes or findings that no financial crimes were committed) are imported from entity data 442 and transaction data 444, and at 434, features (e.g., graphical network features and/or other features and labels corresponding to actual outcomes) are generated, and at 436, a predictive model is trained (via, e.g., training module 146). At 450, the trained predictive model from 436 may be implemented (via, e.g., prediction unit 150) to make predictions regarding financial crimes and fraud, and at 460, alerts are generated and routed (via, e.g., alert router 154) to appropriate devices (e.g., user devices 180, 186) for follow-up reporting and/or investigation.

Figure 5:
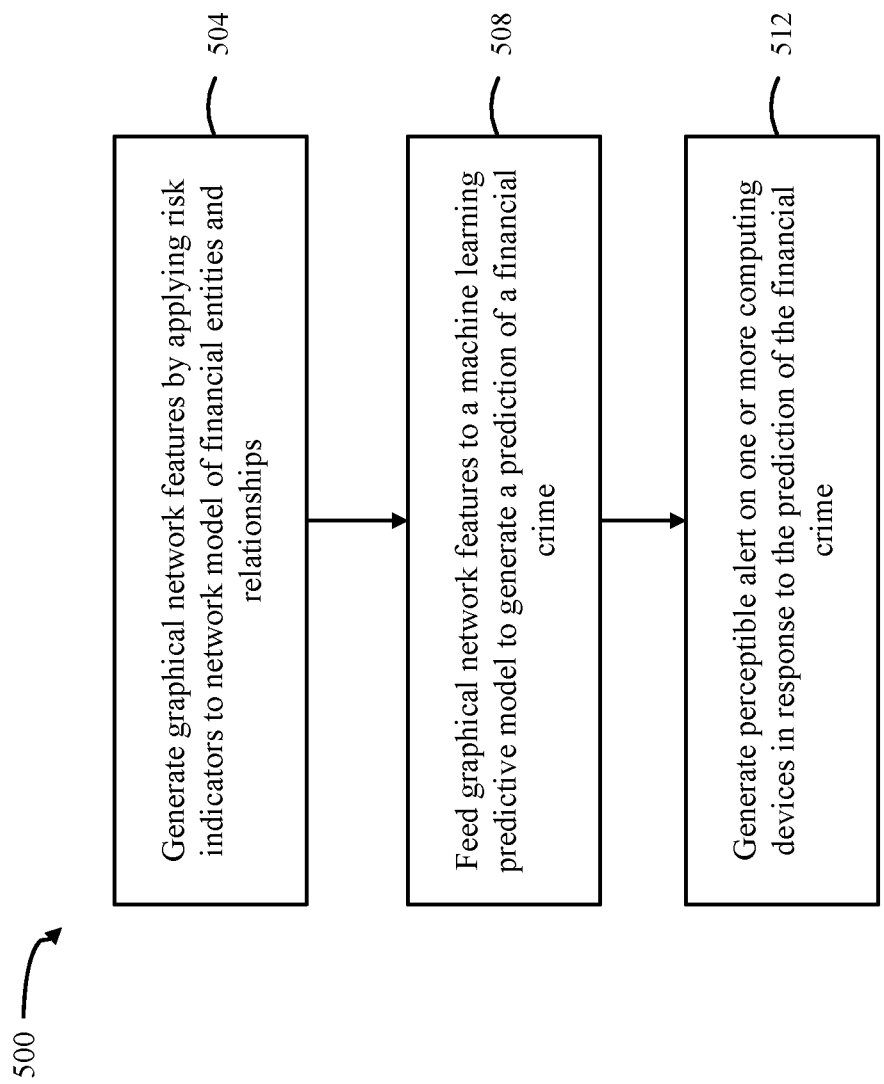
FIG. 5 is a flow diagram of an example process for detecting financial crimes, according to potential embodiments.

FIG. 5 depicts an example process 500 involving provider computing system 110, according to potential embodiments. At 504, graphical network features may be generated (via, e.g., graphical feature generator 142) by applying risk indicators to a network model of financial entities and relationships. The network model of financial entities and relationships may comprise adjacency matrices A, and the risk indicators may comprise real-valued risk vectors z that are compatible (from a matrix-dimension perspective) with the adjacency matrices. At 508, the graphical network features may be fed to a machine learning predictive model (via, e.g., prediction unit 150) to generate a prediction of a financial crime or fraud. The predictive model may, in various embodiments, determine a probability that a financial crime has been committed or attempted, and/or may make a prediction (e.g., yes or no) regarding whether the financial crime has been committed or attempted. That is, the predictive model may output a likelihood of a financial crime and/or an indication as to whether a financial crime has been detected.

At 512, a perceptible alert may be generated on one or more computing devices (via, e.g., alert router 154). The alert may be generated if it is determined, for example, that the probability of a financial crime is greater than a threshold (e.g., greater than 80%, 90%, 95%, or 99%). The alert may, additionally or alternatively, be generated if the predictive model predicted that a financial crime has been committed or attempted (e.g., the predictive model output a "yes"). The alert may identify the financial entities involved, the relevant transactions, and information on the network(s) to which the involved financial entities belong. An example alert is provided in FIG. 7, discussed below.

Figure 6:
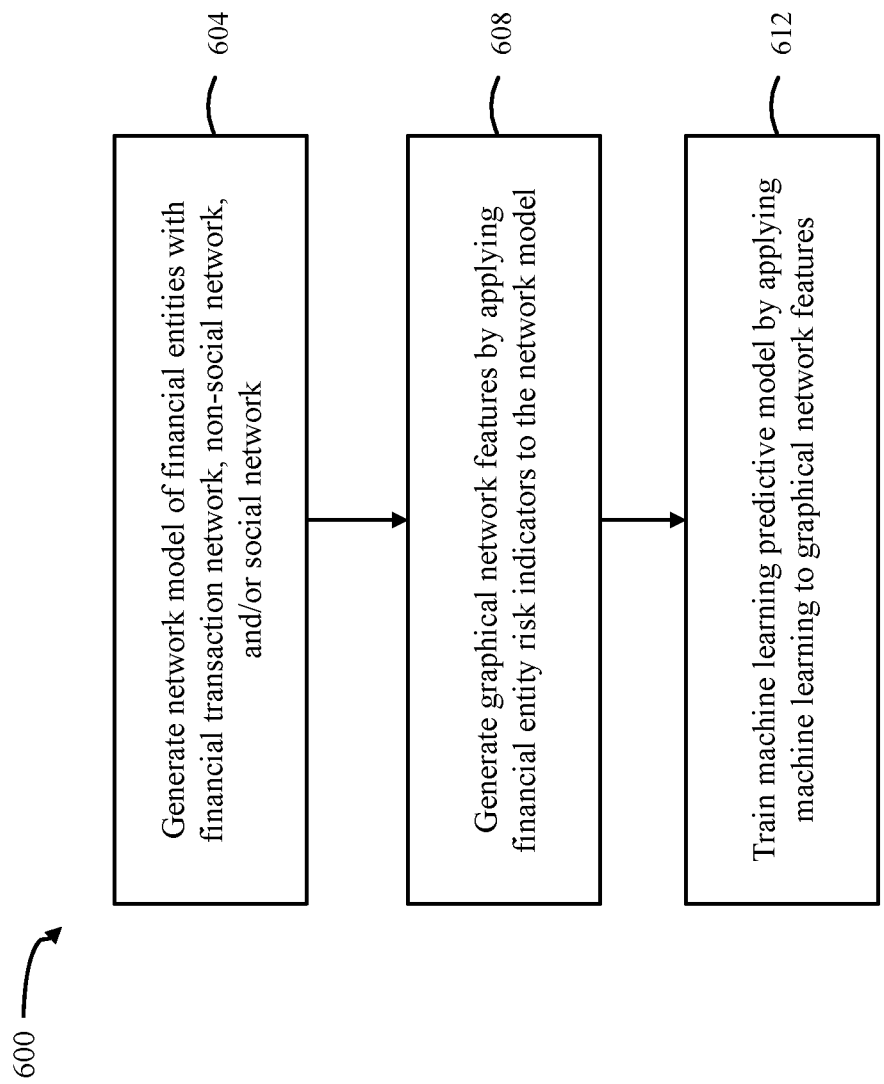
FIG. 6 is a flow diagram of an example process for training a machine learning model for detecting financial crimes, according to potential embodiments.

FIG. 6 depicts an example process 600 involving provider computing system 110, according to potential embodiments. At 604, a network model of financial entities is generated (e.g., via network modeler 138). The network model may include a financial transaction network, a non-social (financial) network, and/or a social network. At 608, the network model may be used, in combination with financial entity risk indicators, to generate graphical network features (via, e.g., graphical feature generator 142). In various embodiments, the network model may comprise adjacency matrices, and the risk indicators may comprise compatible risk vectors. The graphical network features may be generated taking into account a suitable propagation parameter. At 612, a machine learning predictive model may be trained (via, e.g., training module 146) by applying machine learning techniques to the graphical network features and potentially in combination with other features (e.g., non-network-based features). The predictive model may then be used (e.g., by prediction unit 150) to predict financial crimes committed or attempted by financial entities.

Figure 7:
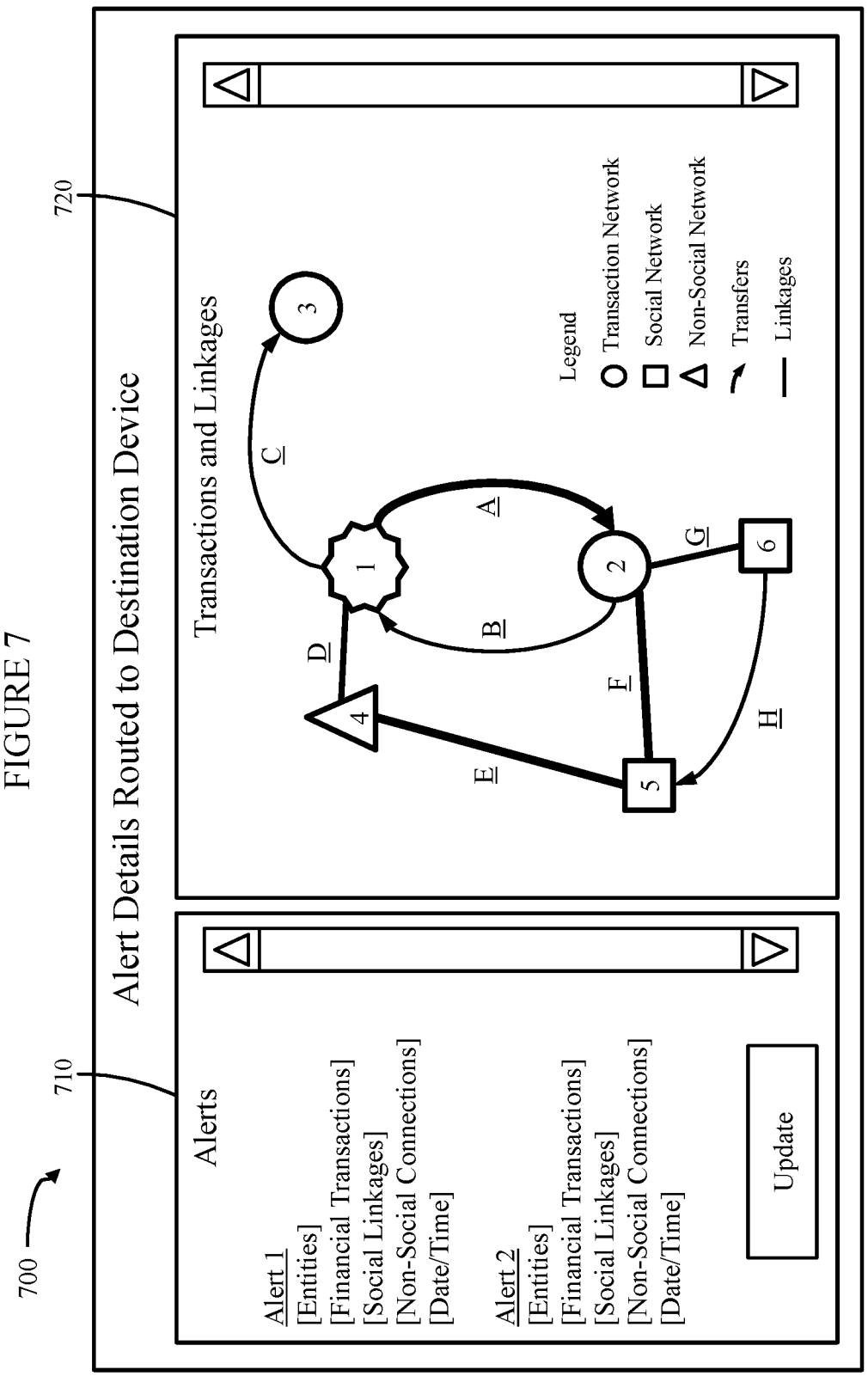
FIG. 7 is an example user interface with details of a financial crime alert with a network representation of financial entities, according to potential embodiments.

FIG. 7 depicts an example graphical user interface 700 with an alert generated via a predictive model, according to potential embodiments. Interface 700 includes an alert details pane 710 and a network pane 720. In the alert details pane 710, interface 700 provides information related to entities and activities that led to, or that are otherwise implicated in, the alert. For example, alert pane 710 may identify the entities involved (e.g., names of persons and organizations), the financial transactions involved (e.g., amounts of funds transferred, beneficiary, date/time of each transfer, etc.), and relevant relationships (e.g., social linkages, non-social connections), and/or the date and time of the alert. An update selector (which may be activated, e.g., by touching the selector on a touchscreen or selecting the update selector using another input device) allows the user to choose to have the list of alerts updated to include, for example, any subsequent data (e.g., subsequent transactions, newly-discovered connections, etc.) discovered via, for example, data monitors 134. In some embodiments, the information may be automatically refreshed in real-time or near real-time, or periodically (e.g., every two minutes or every 30 seconds), in which case if an update selector is also provided, it would be provided to allow the user to manually initiate a refresh prior to the next auto-refresh. A scroll mechanism (i.e., the bar with the triangles at opposing ends) allows the user to scroll the screen to show additional elements that may not fit on one screen.

Network pane 710 includes various graphical representations of relevant networks. For example, network pane 710 is from the perspective of entity 1. As depicted in the example representation of FIG. 7, entity 1 is in a transaction network with entities 2 and 3 (i.e., linked or related transactionally), in a non-social (financial) network with entity 4, in a social network with entity 5 (via entity 4), and in a social network with entity 6 (via entity 2), who is also in a network with entity 5. Entity 1 has engaged in financial transactions with entity 2 (links "A" and "B") and entity 3 (link "C"). The directions of the links (i.e., the arrowheads) indicate who transferred funds to whom (i.e., the payer and the beneficiary). As shown, link A is more heavily weighted (as represented by the thicker line) than links B and C, which may indicate that entity 1 has made more significant transfers to entity 2 (e.g., larger transfers, more frequent transfers, and/or more recent transfers) than transfers received from entity 2, and has made more significant transfers to entity 2 than to entity 3. Entity 1 is linked ("D") to entity 4 via a non-social network (i.e., non-socially), entity 4 is linked ("E") to entity 5 via a social network (i.e., socially), and entity 5 is linked ("H") to entity 6 via a transaction network (i.e., transactionally).

It is noted that any element in interface 700 may be selectable to allow the user to obtain more details, in a pop-up window, in another screen, or otherwise. For example, the user may select an alert, a detail of an alert, an entity, a transaction, a linkage, a network, etc. for more or related information.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for".

Example computing systems and devices may include one or more processing units each with one or more processors, one or more memory units each with one or more memory devices, and one or more system buses that couple various components including memory units to processing units. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated modules, units, and/or engines, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A machine learning method implemented by a computing system of a financial institution, the method comprising:
    training, by the computing system, a machine learning predictive model using historic graphical network features as training data, the machine learning predictive model trained to generate predictions of financial crimes and perceptible alerts identifying financial entities involved in financial crime on one or more computing devices in response to predictions of financial crimes;
    generating, by the computing system, based on a plurality of data records accessed via an electronic database, a network model including a set of financial entities and relationships therebetween, generation of the network model comprising generating an adjacency matrix;
    retrieving, by the computing system, from the electronic database, a plurality of financial entity risk vectors monitored by the financial institution;
    generating, by the computing system, graphical network features by multiplying financial entity risk vectors by the adjacency matrix of the network model, the adjacency matrix being a function of discrete time, the financial entity risk vectors multiplied by the adjacency matrix according to a plurality of propagation steps;
    executing, by the computing system, the machine learning predictive model using the graphical network features as input to generate a prediction of a financial crime, the machine learning predictive model comprising a density-based clustering technique that is a function of a density parameter; and
    generating, by the computing system, a perceptible alert on one or more computing devices in response to the prediction of the financial crime, the alert identifying a subset of the set of financial entities involved in the financial crime, the alert comprising an (i) interactive scroll element that enables presentation of additional elements of the subset of the set of financial entities, and (ii) an interactive update button that causes the alert to be updated with subsequent data corresponding to the subset of the set of financial entities.

2. The machine learning method of claim 1, wherein the network model comprises a financial transaction network of financial transactions between financial entities in the set of financial entities.

3. The machine learning method of claim 2, wherein the computing system defines each edge in the financial transaction network according to at least one of an amount, a frequency, or an incidence of financial transactions between a corresponding pair of financial entities in the set of financial entities.

4. The machine learning method of claim 3, wherein generating the network model comprises detecting, by the computing system, financial transactions in an internal transaction database of the financial institution.

5. The machine learning method of claim 1, wherein the network model comprises a non-social relationship network of non-social relationships between financial entities in the set of financial entities.

6. The machine learning method of claim 5, wherein the computing system defines each edge in the non-social relationship network as denoting existence of a non-social relationship between a corresponding pair of financial entities, each edge weighted according to a characteristic of the corresponding non-social relationship.

7. The machine learning method of claim 6, wherein generating the network model comprises detecting, by the computing system, non-social relationships using customer data stored in a customer database of the financial institution.

8. The machine learning method of claim 1, wherein the network model comprises a social network corresponding to social linkages between financial entities.

9. The machine learning method of claim 8, wherein the computing system defines each edge in the social network as denoting a social linkage between corresponding pairs of financial entities, each edge weighted according to a characteristic of the corresponding social linkage.

10. The machine learning method of claim 9, wherein generating the network model comprises detecting, via the computing system, social linkages using data accessed via at least one of: social media devices; or internet-accessible devices that store news reports or biographies of financial entities.

11. The machine learning method of claim 1, wherein the risk vectors are real-value risk vectors comprising at least one of: transaction-based risk vectors; or customer risk scores.

12. The machine learning method of claim 11, wherein the network model comprises adjacency matrices, and wherein generating the graphical network features comprises generating, by the computing system, graphical network features for combinations of adjacency matrices and risk vectors compatible with corresponding adjacency matrices.

13. A machine learning computing system of a financial institution, the computing system comprising a processor and a memory comprising instructions executable by the processor, the instructions comprising a machine learning platform configured to:
training, by the computing system, a machine learning predictive model using historic graphical network features as training data, the machine learning predictive model trained to generate predictions of financial crimes and perceptible alerts identifying financial entities involved in financial crime on one or more computing devices in response to predictions of financial crimes;
generating, based on a plurality of data records, a network model including a set of financial entities and relationships therebetween;
generate graphical network features by multiplying financial entity risk vectors by an adjacency matrix of the network model, the adjacency matrix being a function of discrete time, the financial entity risk vectors multiplied by the adjacency matrix according to a plurality of propagation steps;
execute the machine learning predictive model using the graphical network features as input to generate a prediction of a financial crime, the machine learning predictive model comprising a density-based clustering technique that is a function of a density parameter; and
generate a perceptible alert on one or more computing devices in response to the prediction of the financial crime, the alert identifying a subset of the set of financial entities involved in the financial crime, the alert comprising (i) an interactive scroll element that enables presentation of additional elements of the subset of the set of financial entities, and (ii) an interactive update button that causes the alert to be updated with subsequent data corresponding to the subset of the set of financial entities.

14. The machine learning system of claim 13, wherein the network model comprises a financial transaction network of financial transactions between financial entities in the set of financial entities, and wherein the machine learning platform defines each edge in the financial transaction network according to at least one of an amount, a frequency, or an incidence of financial transactions between a corresponding pair of financial entities in the set of financial entities.

15. The machine learning system of claim 13, wherein the network model comprises a non-social relationship network of non-social relationships between financial entities in the set of financial entities, and wherein the machine learning platform defines each edge in the non-social relationship network as denoting existence of a non-social relationship between a corresponding pair of financial entities, each edge weighted according to a characteristic of the corresponding non-social relationship.

16. The machine learning system of claim 13, wherein the network model comprises a social network corresponding to social linkages between financial entities, and wherein the machine learning platform defines each edge in the social network as denoting a social linkage between corresponding pairs of financial entities, each edge weighted according to a characteristic of the corresponding social linkage.

17. The machine learning system of claim 13, wherein the network model comprises adjacency matrices, wherein the risk vectors comprise real-value vectors, and wherein the machine learning platform is configured to generate the graphical network features by generating graphical network features for combinations of adjacency matrices and compatible risk vectors.

18. A machine learning method implemented by a computing system of a financial institution, the method comprising:
generating, by the computing system, a network model of financial entities in a first set of financial entities and relationships between financial entities in the first set of financial entities, the network model comprising at least one of:
a financial transaction network of financial transactions between financial entities in the first set of financial entities, wherein each edge in the financial transaction network is defined according to at least one of an amount, a frequency, or an incidence of financial transactions between a corresponding pair of financial entities in the first set of financial entities;
a non-social relationship network of non-social relationships between financial entities in the first set of financial entities, wherein each edge in the non-social relationship network is defined as denoting existence of a financial relationship between the corresponding pair of financial entities, each edge weighted according to a characteristic of the corresponding non-social relationship; or a social network corresponding to social linkages between financial entities, wherein each edge in the social network is defined as denoting a social linkage between corresponding pairs of financial entities, each edge weighted according to a characteristic of the corresponding social linkage;

generating, by the computing system, graphical network features by multiplying financial entity risk vectors by an adjacency matrix of the network model, the adjacency matrix being a function of discrete time, the financial entity risk vectors multiplied by the adjacency matrix according to a plurality of propagation steps;

training, by the computing system, a machine learning predictive model using the graphical network features as training data, the machine learning predictive model comprising a density-based clustering technique that is a function of a density parameter, the machine learning predictive model trained to generate predictions of financial crimes and perceptible alerts identifying financial entities involved in a financial crime on one or more computing devices in response to predictions of financial crimes; and generating, by the computing system, based on an output of the machine learning predictive model, a perceptible alert on one or more computing devices associated with the output, the alert identifying a subset of a second set of financial entities, the alert comprising (i) an interactive scroll element that enables presentation of additional elements of the subset, and (ii) an interactive update button that causes the alert to be updated with subsequent data corresponding to the subset.

19. The machine learning method of claim 18, further comprising:

executing, by the computing system, the machine learning predictive model using graphical network features corresponding to financial entities in the second set of financial entities as input to generate a prediction of a financial crime involving the subset; and generating, by the computing system, the perceptible alert on the one or more computing devices in response to the prediction of the financial crime.

20. The machine learning method of claim 18, wherein the risk vectors are real-value risk vectors comprising at least one of transaction-based risk indicators or customer risk scores, wherein the network model comprises adjacency matrices, and wherein generating the graphical network features comprises generating, by the computing system, graphical network features for combinations of adjacency matrices and compatible risk vectors.

* * * * *